UNITED STATES PATENT OFFICE.

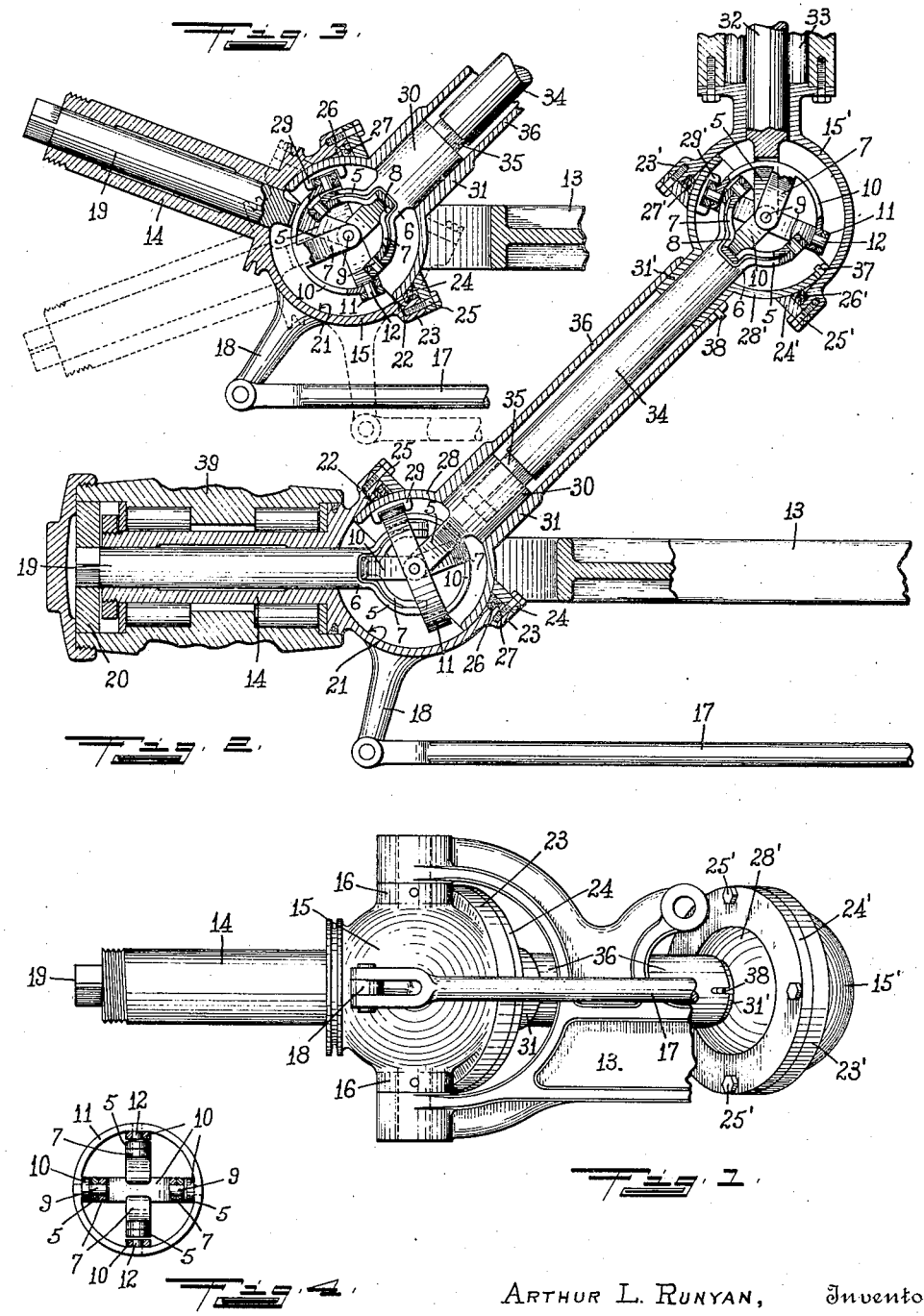

ARTHUR L. RUNYAN, OF OMAHA, NEBRASKA.

COMPOUND UNIVERSAL JOINT.

1,304,103.  Specification of Letters Patent.  Patented May 20, 1919.

Application filed July 3, 1917. Serial No. 178,454.

*To all whom it may concern:*

Be it known that I, ARTHUR L. RUNYAN, a citizen of the United States, and a resident of Omaha, in the county of Douglas and State of Nebraska, have invented certain new and useful Improvements in Compound Universal Joints, of which the following is a specification.

My invention relates to means for operatively connecting rotating shafts extending angularly to each other, and particularly to connecting means of this kind adapted for use where the angles of the shaft-axes are variable. It is the object of my invention to provide mechanism of this kind particularly adapted for use in transmitting power to the steered wheels of motor-vehicles; to provide means enabling two shafts extending approximately at right angles to each other to be operatively connected so that the relation of one shaft to the other may be varied to either an acute or an obtuse angle, and also enabling the shaft-axes to lie in different planes; to provide connecting means of this kind having articulated housing means provided with packing at the joints thereof to retain a lubricant and exclude foreign matter from the working parts; and to provide certain other structures and combinations of parts which will be fully set forth hereinafter.

In the accompanying drawings Figure 1 is a front view of mechanism embodying my invention, showing the same as applied to one of the steered wheels of a motor-vehicle, Fig. 2 is a horizontal section of the same, Fig. 3 is a detail horizontal section showing the angular variation of the driven spindle, and Fig. 4 is a detail vertical section through one of the compound universal joints adjoining the center-ring and parallel thereto.

My invention is especially characterized by the provision of compound universal joints so constructed that each may operatively connect shafts whose axes have an angular variation as great as a right angle. In the structures shown in Figs. 1 and 2 there are two of such compound universal joints, each substantially the same in structure, and comprising an annular member or center-ring, two forks attached to or integral with the ends of the connected shafts, and two yokes or connecting devices between the respective forks and the center-ring. The forks each consist of two diverging curvilinear arms 5 of which the adjacent ends are spaced and connected to each other by an integral U-shaped portion 6, the latter being continuous with a shaft-portion, and the arms 5 being symmetrical to the axis of said shaft-portion. The yokes each have two curvilinear arms 7 and a connecting U-shaped portion 8, the ends of the arms 7 fitting between and being pivotally connected with the ends of the fork-arms 5 by pins 9 axially alined with each other and extending at right angles to the axis of the shaft-portion of the respective fork. Each yoke is freely swingable within the respective fork, about the axis of the pins 9, or, conversely, the fork may swing pivotally about the respective yoke, the U-portion 8 of the yoke being of such proportions that it will pass through the U-portion 6 of the fork. Each yoke also has two curved arms 10 which extend in a plane at right angles to the plane of the arms 7 and U-portion 8, the adjacent ends of the arms 10 being integral with the central part of the U-portion 8, and the outer ends of the arms 10 being so spaced that they may straddle or pass externally to the ends of the arms 5 of the opposing fork. Said outer ends of the arms 10 fit within and are pivotally connected with the annular member or center-ring 11 by means of pins 12 which are axially alined with each other, the axis of said pins 12 being at right angles to the axis of the pins 9 for the respective yoke, and said axes intersecting at a point alined axially with the shaft-portion of the respective fork. The axes of the two pairs of pins 12, which connect the yokes to the ring 11 are in the same plane but at right angles to each other, and the yokes extend out from opposite sides of the ring. It will be seen that each yoke is freely swingable about the axis of its pivot-pins 12 through an angle of forty-five degrees or more each way from an intermediate position at which the axis of the pins 9 of the yoke lies in the same plane as the ring. It will also be seen that the axes of the pivot-pins 9 and 12 of both yokes, and the axes of the shaft-portions of both forks, constantly intersect at a common point which is central to the ring both diametrically and axially. In consequence of the right-angled pivotal connections between the fork and yoke, and between the yoke and ring, at each side of the joint-structure, either fork may drive or be driven by the ring, both the fork and ring rotating freely about their respective axes when said axes are out of alinement with each other by any angle of forty-five degrees or less. By a proper proportioning of the parts, substantially as shown in the drawings, each side or half of the structure is operable without interference with the other when the axes of the ring and shaft-portions are at any angles less than the maximum above stated, so that the total angle between the fork-axes may be as great as ninety degrees or a right angle. In practice the rings 11 are held, by suitable guiding means therefor such as hereinafter described, so that the plane of the ring will bisect the angle normally formed between the axes of the forks, or so that the axis of the ring will be at equal angles to the normal axes of the forks; as by this means the work is proportioned equally between the two sides or halves of the joint-structure and the same enabled to operate with greatest efficiency.

Referring now to the combined structure shown in the drawings, there is indicated at 13 one of the forked ends of a motor-vehicle axle, which is presumed to be yieldably connected with the frame of the vehicle so as to be movable vertically with respect to said frame. A tubular wheel-spindle 14 has a hollow globular head 15 with bosses 16 at the upper and lower sides thereof, said bosses fitting between the upper and lower arms of the axle-fork, and vertical pivot-pins extending from said bosses through the terminal portions of the fork-arms, as indicated by dotted lines in Fig. 1. The wheel-spindle 14 is movable in a horizontal plane about the vertical axis of said pivot-pins, the angle between the spindle and axle being varied by the steering mechanism of the vehicle, and said steering mechanism being connected with the spindle-head 15 by means of a cross-rod 17 and an arm 18 on said head. The hub 39 of the vehicle wheel fits revolubly upon the spindle 14, the wheel being actuated by a drive-spindle 19 extending through the bore of the spindle 14. In the structure shown, the outer end of the drive-spindle 19 is squared and fits in a rectangular opening in a connecting plate 20, the latter fitting within a recess therefor in the outer end of the hub 39, and said plate and recesses being hexagonal or otherwise non-circular, so that the plate may form a driving connection between the spindle and hub. The inner end of the drive-spindle 19 carries one of the forks of a compound universal joint of the structure first herein described, said universal joint being partly inclosed by the globular head 15. The joint is so disposed that its center (the point of insertion of the axes of the pivot-pins 9 and 12 and the fork-axes) is intersected by the vertical axis of the pivot-pins which connect the head 15 with the axle-fork. The inside of the head 15 is bored out to form a semispherical surface 21 which merges into a cylindrical surface 22 of like diameter, the latter surface being on the inside of a cylindrical extension 23 at one side of the head 15. At the end of the cylindrical part 23 a ring 24 is secured by means of screws 25, the inner edge of said ring being sphero-segmental and concentric with and of equal radius to the surface 21. In the end of the part 23 is an annular packing-groove containing at one side a ring 26 and having packing material 27 between said ring and the end-ring 24. The inner edges of the ring 26 and packing 27 form continuations of the same spherical surface which is prolonged in the surface 21 and the edge of the opening through ring 24. A hollow sphero-segmental member 28 fits pivotally within and bears upon the described spherical surface, said member 28 completing the inclosure of the universal joint, and having secured upon the inner side thereof a U-shaped guide 29 for the center-ring 11 of the joint. The shaft 30 for the fork at one side of the universal joint has a bearing in a neck 31 formed integrally with the member 28, and when the parts are in the normal positions shown in Fig. 2 the axis of the shaft 30 is forty-five degrees or half of a right angle out of alinement with the spindle 19, and is axially alined with the cylindrical part 23 of the housing. The spindle-bearing part of the housing may be turned between the extreme positions shown by full and dotted lines in Fig. 3, and in the latter or dotted-line position the axis of the spindle 19 is nearly in alinement with the axis of the center-ring 11 of the universal joint, while in the first or full-line position the axis of said spindle is almost forty-five degrees out of alinement with the ring-axis.

A shaft 32 extending longitudinally of the vehicle, or at right angles to the axle 13, is journaled in a bearing 33 which is presumed to be carried by the vehicle-frame and disposed so that the axis of the shaft lies in approximately the same horizontal plane as that of the wheel-spindle. At the end of said shaft 32 is carried one of the forks of the second universal joint, and the second fork of said joint is formed on the end of a shaft 34. Said shaft 34 is coaxial with the shaft 30 and has a squared end-portion 35 fitting slidably in a square central opening in said shaft 30. The second universal joint is inclosed by a housing consisting of a member 15' secured to the bearing 33, and having associated therewith parts 23', 24', 25', 26', 27', 28', 29' and 31', each substantially the same as the corresponding and similarly numbered parts of the housing first described. The neck 31', however, is of smaller diameter than the neck 31, and fits slidably within a tubular part 36 which is formed integrally with the neck 31 and which incloses the intermediate portion of the shaft 34. In one edge of the member 28' there is a meridional slot into which a pin 37 extends from the inner side of the member 15', as shown. Said pin 37 prevents rotation of the member 28' about the axis of the shaft 34, but permits a limited oscillatory movement of the member 28' relatively to the member 15'. A pin 38 on the neck 31' extends into a slot in the end of the tubular part 36 and prevents rotation of the same and the member 28.

From the foregoing it will be seen that my invention provides means by which two shafts, such as the shaft 32 and the spindle 19, extending normally at right angles to each other, may be operatively connected so that the driven shaft or spindle is variable from an acute angular relation to an obtuse angular relation to the driving shaft, as when the wheel-spindle is moved from the normal position to the positions represented in Fig. 3. It will also be seen that the compound universal joints, articulated housings therefor, and slidably connected diagonal shafts 30 and 34, enable vertical movements of the wheel-spindle and axle 13, relatively to the driving shaft 32 and bearing 33, without such movements interfering in any way with the operative connection between said driving shaft and the wheel-driving spindle.

It will be seen further that the described housing means forms a substantially oil-tight inclosure for the universal joints and connected shafts, enabling the same to be efficiently lubricated, and excluding therefrom dust or other foreign matter.

The details of construction of some of the described parts, accessory to the hereinafter claimed mechanism, are merely illustrative of the more extended and general uses for which said mechanism may be employed, and are extracted from my co-pending application for patent on motor driven trucks and tractors, filed June 23, 1917, Serial No. 176,639, wherein said accessory matter is claimed in so far as it is essential to the subject matter of said application.

Now, having described my invention, what I claim and desire to secure by Letters Patent is:

1. A compound universal joint comprising two forks, each symmetrical to the axis of a shaft, yokes having parts fitting within said forks and pivotally connected with the ends thereof on axes at right angles to the respective shaft-axes, each yoke having arms extending in a plane at right angles to the parts within the fork and symmetrically thereto, an annular member fitting about the spaced ends of said arms, and means pivotally connecting said annular member and spaced ends, the axes of said connecting means being in a common plane and intersecting at right angles, each of said axes also being in a plane common to and at right angles with the respective fork-and-yoke connection, and the yokes and forks extending oppositely from the plane of the annular member.

2. A compound universal joint comprising a center-ring, two yoke-members disposed within said ring and each pivotally connected therewith, the pivotal axes thereof being at right angles to each other in a common plane and the members extending oppositely to each other from said plane, and two revolubly mounted forks straddling the respective yoke-members and pivotally connected therewith, each on an axis at right angles to the first-named pivotal axis of the respective yoke-member.

3. A compound universal joint comprising a center-ring, two yoke-members pivotally connected with said ring on axes at right angles to each other in a common plane, the yoke-members extending oppositely from the plane of said axes, two revolubly mounted forks straddling the respective yoke-members and pivotally connected therewith on axes at right angles to the first-named axes of the respective yokes, the axes of revolution of the forks being angular to each other but having a common point of intersection with the first and last named pivotal axes of the yoke-members, and guiding means for holding the center-ring in a plane substantially bisecting the angle between the axes of revolution of the forks.

3. A compound universal joint comprising a ring, two yokes having pairs of arms oppositely disposed and pivotally connected with the ring on axes extending at right angles in a common plane, revolubly mounted forks having arms symmetrical to the axis of revolution thereof, said arms straddling the yokes and pivotally connected with arms thereon extending in planes at right angles to the first-named arms thereof, and the pivotal axes first and last named and the axes of revolution of the forks all intersecting a common point.

5. In a device of the class described, two shafts revolubly mounted on axes diverging from a point of intersection, forks symmetrical to said axes and carried at the adjacent ends of the shafts, yokes connected pivotally with the ends of the respective forks on axes at right angles to the shaft-axes, an annular member pivotally connected with the yokes on axes at right angles to each other, the latter axes and the axes of pivotal connection of the yokes and forks all passing through the point of intersection of the shaft-axes, and guiding means for holding said annular member in a plane substantially bisecting the angle between the shaft-axes.

6. In a device of the class described, shafts revoluble on angularly intersecting axes, an annular member centered about the point of intersection of the shaft-axes, members intermediate said annular member and shafts, each of said intermediate members being pivotally connected with both the annular member and the respective shaft on axes intersecting at right angles the center of the annular member, sphero-segmental interengaged housing parts centered with said annular member and completely inclosing the same, and bearings for the shafts carried by said housing parts.

7. In a device of the class described, shafts revoluble on angularly intersecting axes, an annular member centered about the point of intersection of the shaft-axes, members disposed intermediate said annular member and the adjacent portions of the shafts, said intermediate members each being pivotally connected with both the annular member and the respective shaft on axes intersecting at right angles to each other and at the center of the annular member, sphero-segmental interengaged housing parts centered with the annular member and having bearings for the shafts, and a guide on one of said housing parts for holding the annular member in a plane substantially bisecting the angle between the shaft-axes.

ARTHUR L. RUNYAN.